March 13, 1934.  E. M. ORLOW  1,951,061
LAWN TOOL
Filed Oct. 7, 1932
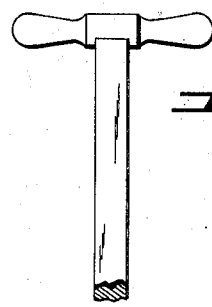
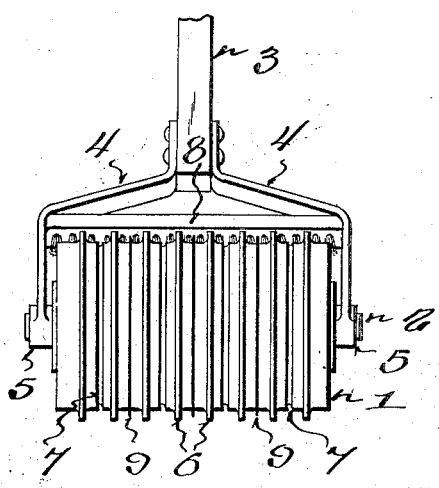
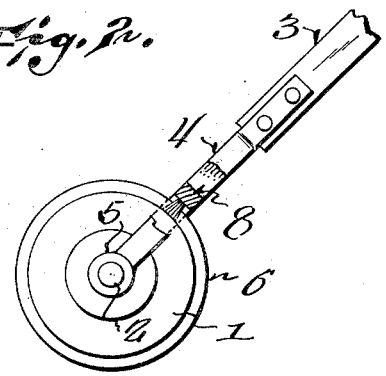
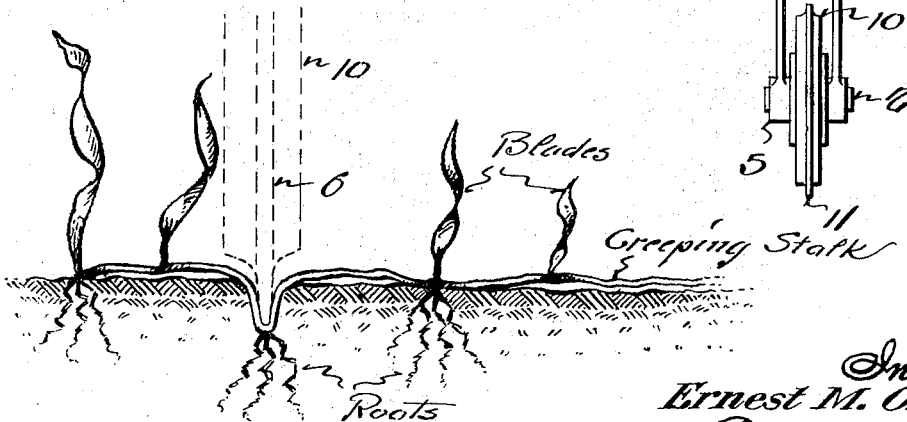
Inventor
Ernest M. Orlow
By Young & Young
Attorneys Patented Mar. 13, 1934

1,951,061

UNITED STATES PATENT OFFICE 1,951,061

LAWN TOOL

Ernest M. Orlow, Wauwatosa, Wis.

Application October 7, 1932, Serial No. 636,667

3 Claims. (Cl. 111—1)

This invention pertains to a method and apparatus for the treatment of lawns, and more particularly lawns made from what is commonly known as creeping bent grass.

The characteristics of creeping bent grass are well-known, and include its ability to spread and take root at such points as its stalks or creepers come into proper contact with the earth or ground.

For a more complete understanding of the foregoing, the drawing contains a view of a stalk of creeping bent grass, illustrating the manner in which the same will sprout a plurality of blades throughout its length, and take fresh root at points contacting with the ground, it being understood that at these points additional creeping stalks are also put out, which multiply at an extremely rapid rate, thus causing sparsely set plants to quickly spread and cover the entire ground, forming an extremely hardy, close, matted lawn of exceedingly attractive appearance, and requiring a minimum amount of water, thus rendering the same particularly desirable for lawns and golf greens in localities having light rainfall or a limited supply of water for irrigating purposes.

In the natural growth of creeping bent grass, it is noted that the stalks in many instances do not properly contact with the ground to cause them to take additional root, and after acquiring any appreciable length, the same have a tendency to dry up and die, due to lack of sufficient moisture. Therefore, in order to promote rapid, hardy growth of the grass, it is essential that proper contact be made between the stalks and the ground at suitable intervals.

It is therefore the primary object of the present invention to provide an improved method and tool for treating lawns made from creeping bent grass, whereby the same is caused to take root at desired intervals to promote the most rapid propagation and growth of the grass.

Incidental to the foregoing, a more specific object resides in tucking the stalks into the ground, an operation which not only results in intimate contact between the stalk and the ground, essential to taking root, but also serves to cultivate, aerate, and fertilize the ground, in that such blades of grass, which may be forced into the ground, quickly deteriorate and provide a highly effective fertilizer.

A more specific object of the invention resides in the provision of a device having one or more tucking blades, which, as they are passed over the stalks, tuck the same into the ground, causing them to take root at those points.

A still further object, in connection with the foregoing, resides in the provision of spaced knives adapted to sever the stalks, thus promoting their rapid growth in much the same manner resulting from ordinary pruning.

With the above and other objects in view, which will appear as the description proceeds, the invention resides in the novel construction, combination and arrangement of parts, substantially as hereinafter described and more particularly defined by the appended claims, it being understood that such changes in the precise embodiment of the herein disclosed invention may be made as come within the scope of the claims.

In the accompanying drawing is illustrated one complete example of the physical embodiment of the present invention constructed according to the best mode so far devised for the practical application of the principles thereof.

In the drawing:

Figure 1 is a front elevation of the preferred form of tool employed in the present invention.

Figure 2 is a side elevation of the same.

Figure 3 is a view illustrating a stalk of bent grass, and the manner in which the tucking operation is performed, and Figure 4 is a fragmentary detail of a modified form of tool that may also be used in practising the present invention.

Referring now more particularly to the accompanying drawing, the preferred form of tool, as disclosed in Figures 1 and 2, is designed for use upon lawns of substantially large area, and comprises a roller 1, which may be formed of any suitable material to provide the desired weight, such as a solid casting or forging. Should a hollow construction be desired, the same can be filled with any suitable material, such as lead, or, in some instances, with water, as is now commonly used in conventional lawn rollers.

The roller 2 is provided with an axial shaft 2, the ends of which project therefrom for the reception of a conventional handle 3, the arms 4 of which straddle the roller and receive the ends of the shaft 2 in their hubs 5.

While one form of handle has been illustrated and described, it is to be understood that various structures may be used, such as a pair of spaced arms connected by one or more cross members, one of which may serve as the handle.

As best shown in Figure 1, the roller 1 is provided with a plurality of spaced annular ribs 6, which serve to engage the stalks of the creeping grass at spaced intervals, and tuck them into the ground, as will be hereinafter described in further detail.

In some instances the periphery of the roller may be provided with restricted annular grooves intermediate the rib 6, for the purpose of breaking any suction that might occur between the surface of the roller and the ground, particularly when the ground is wet, thus preventing ground from adhering to the surface of the roller. To further clean the roller of grass, or other small accumulation, a transverse brush 8 may be provided, the same being attached to the arm 4 of the handle in any suitable manner, and having its bristles projecting between the annular ribs for engagement with the periphery of the roller.

Here it is to be understood that the groove 7 and brush 8 are not essential to the invention, but are merely provided in certain instances to increase the efficiency of the tool.

Likewise, in some instances, it may be desirable to sever the stalks at spaced intervals to promote more rapid growth, and in such case the roller 1 may be provided with any desired number of annular knives 9 positioned intermediate or adjacent the tucking ribs 6. Here it might be explained that the cutting knives are preferably terminated short of the peripheral edge of the tucking ribs, thus causing the tucking operation to take place just prior to the cutting or severing operation. However, in some instances, the cutting blades may be of the same diameter as the tucking blades to perform a severing operation simultaneously with the tucking.

While the preferred form of the invention has been described in considerable detail, it is to be understood that the salient feature of the same resides in the provision of any suitable tool for tucking in the stalks, and, therefore, on small greens or lawns a relatively narrow disc 10, provided with a single annular tucking rib 11, such as shown in Figure 4, may be provided.

Likewise, it is not essential that the tool be in the form of a roller, as the roller 1 or disc 10 might be rigidly connected to the handle, and merely dragged or pushed over the lawn without rotation. Also, a flat drag provided with a longitudinal rib might be used, or the ribs may be secured to a tamper. In the latter case, it might be desirable to use a resilient filler adjacent the ribs, which would allow projection of the ribs into the ground, and, as the same are withdrawn, expansion of the filler would strip and prevent dirt from accumulating between the ribs, much the same as the brush on the roller structure.

From the foregoing explanation, taken in connection with the accompanying drawing, it will be readily appreciated that various means and modes of operation may be employed in practising my improved method. That is, the tool may be rolled over the grass, dragged, or pushed, and its own weight may be depended upon to project the tucking ribs into the ground, or pressure may be exerted on the device by the operator. In operation, where a drag or tamping form of tucker is employed, it may be desirable to first wet the ground sufficient to soften the same. However, if the ground is loose, this is not essential, and where the roller type tucker is employed, which is the preferred form, due to the ease of operation, its weight may be so regulated as to obtain the desired penetration of the tucking ribs.

It is believed that the advantages of the invention will be quite apparent, in that as the roller passes over the creeping stalk, the rib 6 engages the same and tucks a sufficient portion into the ground, as shown in Figure 3, to cause the same to take root, thus further feeding the stalk, and, in addition thereto, the stalk at the point of taking root will propagate and put out additional creepers. During the tucking operation, particularly where the roller is employed, a slight twist from side to side will cause the tucking ribs to loosen the earth, much the same as in cultivating, thus aerating the ground, eliminating small weeds, and producing the usual advantages which result. At the same time the roller serves to level the ground and eliminate objectional bumps. In addition to the foregoing, where that form of tool as disclosed in Figure 4 is employed, the same has other uses, such as cutting and edge trimming.

In planting, my tool can also be used, it being merely necessary to distribute the stalks on the ground, the tool thus serving to tuck the same into the earth where they promptly take root.

Having explained the invention in considerable detail, I claim the following:—

1. A tool for treating lawns formed from creeping bent grass, comprising a roller, a plurality of spaced annular tucking ribs carried by said roller, and cutting means carried by said roller adjacent said ribs.

2. A tool for treating lawns formed from creeping bent grass, comprising a roller, a handle connected with said roller, a plurality of annular spaced ribs carried by said roller, a brush carried by said handle for cleaning the surface of said roller as the same is rotated, and an annular knife carried by said roller intermediate said tucking ribs, the surface of said roller being provided with an annular groove adjacent said tucking ribs.

3. A tool for treating lawns formed from creeping bent grass, comprising a roller, a handle connected with said roller, a plurality of spaced annular tucking ribs carried by said roller, annular cutting knives carried by said roller intermediate said tucking ribs and of smaller diameter than said tucking ribs, the surface of said roller being provided with annular grooves adjacent said tucking ribs, and a brush carried by said handle for cleaning the surface of said roller.

ERNEST M. ORLOW.